(12) United States Patent
Bruwer et al.

(10) Patent No.: US 6,828,739 B2
(45) Date of Patent: Dec. 7, 2004

(54) LIGHT EMITTING DEVICE

(75) Inventors: Frederick Johannes Bruwer, Paarl (ZA); Alan Frederick Butler, Oxfordshire (GB)

(73) Assignee: Azoteq (PTY) LTD, Paarl (ZA)

( * ) Notice: Subject to any disclaimer, the term of this patent is extended or adjusted under 35 U.S.C. 154(b) by 0 days.

(21) Appl. No.: 10/430,376

(22) Filed: May 7, 2003

(65) Prior Publication Data

US 2004/0021431 A1 Feb. 5, 2004

Related U.S. Application Data

(63) Continuation of application No. PCT/ZA01/00171, filed on Nov. 7, 2001.

(51) Int. Cl.[7] .............................. G05I 1/00; H05B 41/36
(52) U.S. Cl. ....................................... 315/291; 340/641
(58) Field of Search .......................... 315/200 R, 209 R, 315/291, DIG. 5, DIG. 7, 82, 88; 340/458, 479, 641

(56) References Cited

U.S. PATENT DOCUMENTS

| | | |
|---|---|---|
| 4,380,718 A | 4/1983 | Miller |
| 4,495,444 A | 1/1985 | Thomas |
| 4,734,625 A | 3/1988 | Geanous et al. |
| 5,061,879 A | 10/1991 | Munoz |
| 5,216,328 A | 6/1993 | Lu |
| 5,430,354 A | 7/1995 | Garbowicz et al. |
| 5,680,098 A * | 10/1997 | Bejster et al. ............... 340/458 |
| 5,821,700 A * | 10/1998 | Malvaso ..................... 315/291 |
| 6,100,652 A * | 8/2000 | Konopka ..................... 315/291 |
| 6,608,451 B2 * | 8/2003 | Collins ........................ 315/276 |

FOREIGN PATENT DOCUMENTS

| | | |
|---|---|---|
| DE | 90 12 641 | 11/1990 |
| FR | 2 376 587 | 7/1978 |
| FR | 2 634 339 | 1/1990 |
| WO | WO 99 20085 | 4/1999 |

* cited by examiner

Primary Examiner—James Vannucci
Assistant Examiner—Minh Dieu A
(74) Attorney, Agent, or Firm—Jones, Tullar & Cooper PC

(57) ABSTRACT

A light emitting device includes at least a first light source which is connectable to an energy source, a second light source, detector means for detecting a failure of the first light source, and switch means, responsive to the detector means, for enabling the connection of the second light source to the energy source when the detector means detects failure of the first light source.

10 Claims, 3 Drawing Sheets

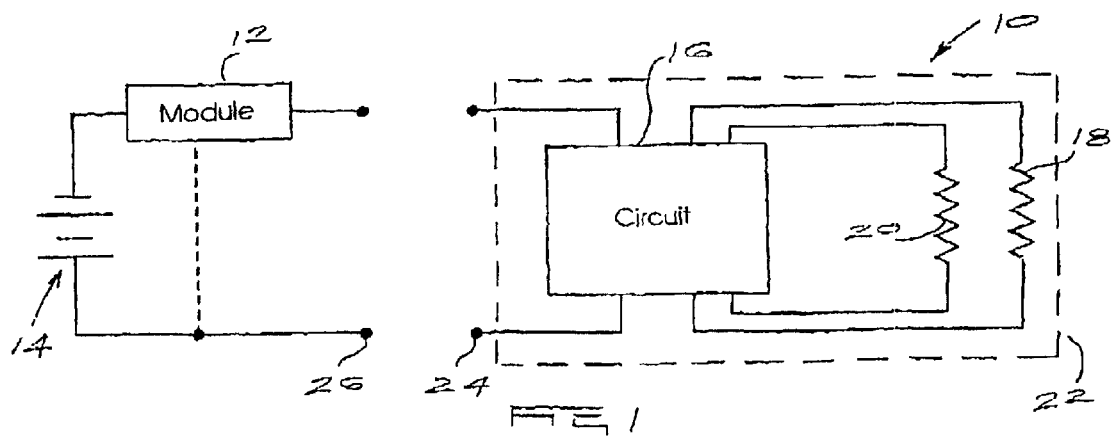
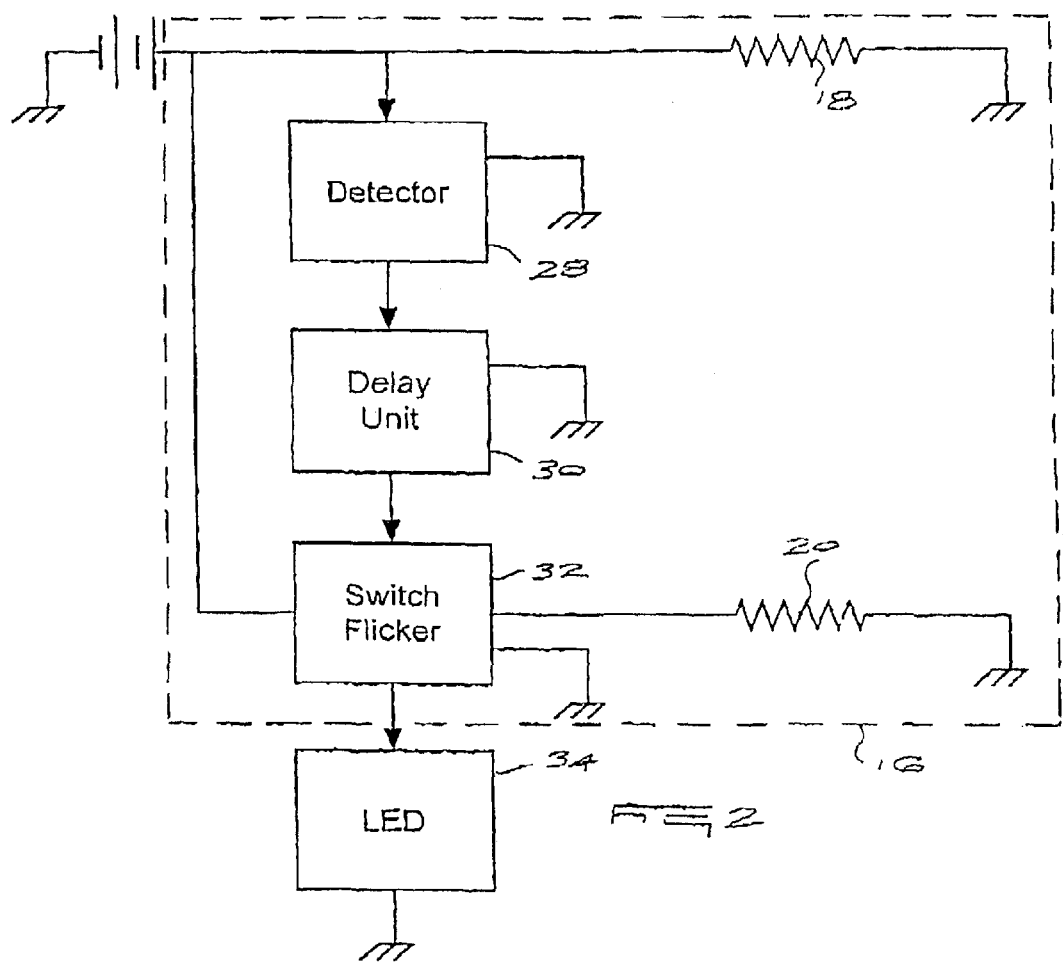

LIGHT EMITTING DEVICE

CROSS REFERENCE TO RELATED APPLICATIONS

This application is a continuation, under 35 U.S.C. § 120 and 365(c), of International Application No. PCT/ZA01/00171, which was filed on Nov. 7, 2001 and designates the US.

BACKGROUND OF THE INVENTION

This invention relates generally to a light emitting device and more particularly is concerned with monitoring and controlling the operation of a light emitting device such as a globe.

Light emitting devices such as incandescent globes, intended for example mainly for the domestic market, have been fabricated with two or more elements. If one element should fail then the globe is rotated so that additional contacts on the globe are connected to an electrical supply, thereby allowing a second element to be energized in place of the failed first element. Globes for vehicles with two filaments (dim/bright) are also known in the art U.S. Pat. No. 4,580,079 to Koo allows for a surge of current to blow a fuse that will result in a mechanical switchover to occur.

Failure of a light source, e.g. a globe, in a lighting installation such as a building is normally easily detectable and non-critical for appropriate action may readily be taken. On the other hand for example, if a globe fails in a vehicle or in a difficult to reach installation, such as on a mast, then failure of the light source may not always be easily detected or ascertainable and, even if detected, appropriate rectifying action may be difficult to take without the use of workshop facilities or special tools.

Many vehicles do have circuits which monitor the operation of electrical components such as headlights, brake lights, tail lights and so on. If a headlight should fail this will possibly be noticed by the driver of the vehicle but it may be difficult for the driver to take immediate remedial action to replace the globe. On the other hand the driver of a vehicle would be quite oblivious of the failure of a tail or brake light unless the vehicle includes light monitoring circuits with appropriate indicators.

It would be convenient if preventative actions could be taken during regular scheduled maintenance. For example, when a vehicle is serviced, it would be convenient if all light bulbs due to fail shortly could be replaced. It would also improve road safety.

SUMMARY OF THE INVENTION

The invention provides a light emitting device which includes at least a first light source which is connectable to an energy source, a second light source, detector means for detecting a failure of the first light source, and switch means, responsive to the detector means, for enabling the connection of the second light source to the energy source when the detector means detects failure of the first light source.

The light emitting device may include delay means, to which the switch means is responsive, for delaying the said connection of the second light source to the energy source for a predetermined time interval. This allows the failure of the first light source to be detected by external failure detection means, for example in a light monitoring system of a vehicle.

The light emitting device may include indicating means for providing an indication of the failure of the said first light source. Such indicating means may take on any suitable form and, for example, may consist of a visual indicator.

The indicator means may alternatively or additionally cause a recognizable variation in operation of the second light source. For example the indicator means may cause the second light source to flicker for a predetermined time interval or in a predetermined flashing sequence.

The device may include a control circuit which preferably is in the form of an integrated circuit, for controlling the operation of at least the switch means. The detector means is preferably formed integrally with the control circuit, The light sources in the light emitting device may take on any suitable form and for example may comprise incandescent elements or filaments, halogen quartz units, discharge devices, light emitting diodes (LED's) and the like. The scope of the invention is not limited in any way in this regard.

In a preferred embodiment of the invention the light emitting device is packaged or configured in the shape of a conventional light source, such as a bulb or globe, so that the light emitting device of the invention can be used as a direct replacement of the conventional light source.

It therefore falls within the scope of the invention for the first and second light sources to be located inside an enclosure which is at least partly translucent and for the said detector means and switch means to be mounted to or located within the enclosure.

In another embodiment at least the second light source, i.e. the back-up or spare light source, and the failure detector means, are combined in the form of a conventional light bulb which can be used in conjunction with the first light source, i.e. as ordinary (primary) light bulb, and which will be energized only if the primary light bulb fails.

Various parameters which are dependent on the correct functioning of the first light source can be monitored to detect failure of the first light source. For example the heat which is generated by the first light source can be monitored. The current which is drawn by, or the voltage drop over, the first light source can also be measured. Closely linked to the foregoing is a direct or indirect measurement of the resistance of the first light source.

Another possibility is to monitor the intensity of the light, at visible or infrared frequency, emitted by the first light source. One could also measure the strength of a magnetic field associated with the first light source, e.g. the magnetic field generated by current flowing through the first light source. The invention is not limited in this regard.

In a preferred embodiment the device includes an integrated circuit and at least the detector means and the switch means are incorporated in the integrated circuit. Any other suitable control or switching functions may be integrated in, or be provided by, the integrated circuit. The detector means may for example be a light sensor, such as a light sensitive device or any equivalent device, which is fabricated on the integrated circuit e.g. during a standard CMOS production process. The switch means, which may be responsive to controlling logic, can also be included in the integrated circuit.

The integrated circuit may be designed to work intermittently so that its operating life is prolonged. For example the integrated circuit may be designed to work only for a short period after it is powered up. This is specifically to prevent fast degradation of the integrated circuit due to the effects of heat.

The integrated circuit can also be used to control the duty cycle of any of the light sources, and particularly the back-up light source, so that such light source emits light of a desired intensity.

If power can be provided to the integrated circuit permanently, irrespective of either light source being energized, then the integrated circuit can be provided with a memory function and can indicate a failure of the first light source even if power is not being applied to the first light source nor to the second light source. This can for example be in a period immediately after power to each light source is turned off.

In a specific embodiment the detector means may include a light sensor and the output of the light sensor, in response to incident light, can be measured in volts or in any other suitable way. When the power to the first light source is applied the integrated circuit can store the output of the light sensor using a sample and hold technique. The spare or second light source can then be activated. After a short period to let the second light source warm up and produce light another measurement can be taken and the new measurement can then be compared with the value which was stored. If the difference between the two values is greater than a defined threshold the light source will be regarded as having failed. The process can be repeated a few times to ensure that the measurement is accurate.

The light sensor and, optionally, the integrated circuit can be located at positions at which the effects of sunlight and also of heat generated by the light sources are relatively low.

The number of light sources to monitor for failure can be more than one and the number of spare or second light sources can also be more than one.

Although the invention is described particularly with reference to 12 volt automotive applications the invention is not restricted in this regard for many other applications are possible including, but not limited to, AC and DC lighting in buildings of all kinds, whether business, industrial or domestic, and in other installations.

BRIEF DESCRIPTION OF THE DRAWINGS

The invention is further described by way of examples with reference to the accompanying drawings in which:

FIG. 1 is a block diagram representation of a light emitting device according to the invention, FIG. 2 illustrates certain components of the light emitting device shown in FIG. 1.

DESCRIPTION OF PREFERRED EMBODIMENTS

Figure 3:
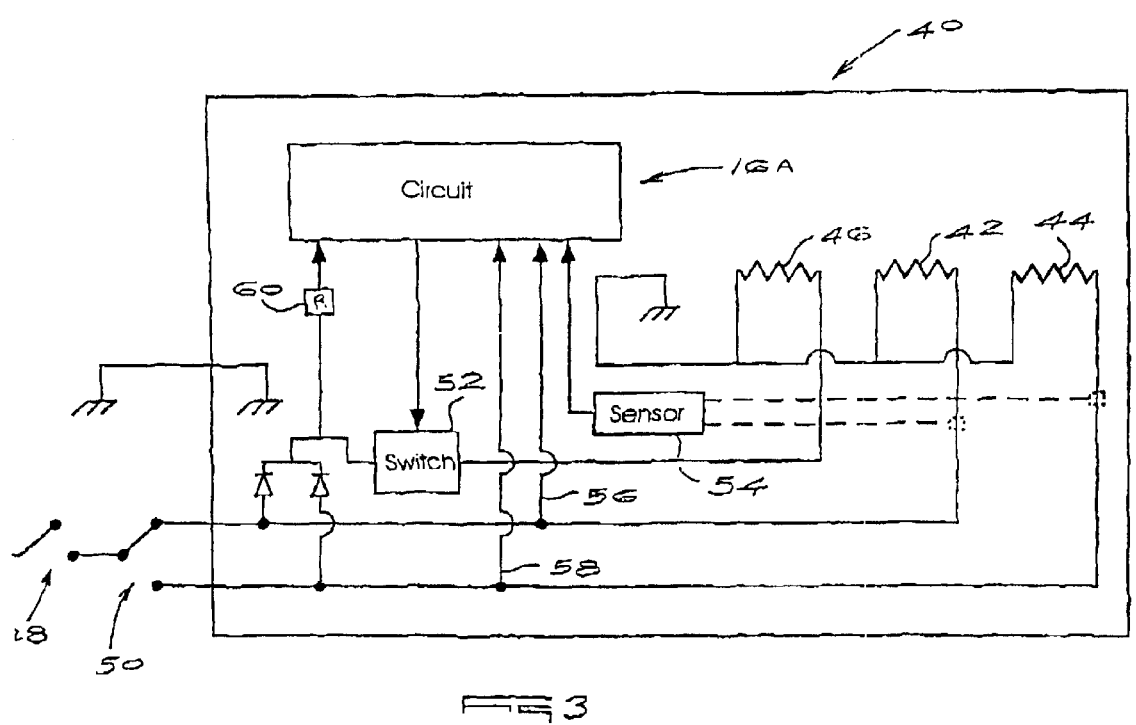
FIGS. 3 to 5 respectively illustrate different embodiments of the invention.

FIG. 1 of the accompanying drawings illustrates, in block diagram form, a light emitting device 10, an electrical module 12, and an energy source, e.g. a battery, 14.

The invention is described hereinafter with reference to the installation of a globe on a vehicle. It is to be understood however that this example is merely illustrative and that the scope of the invention is not confined to this application.

The light emitting device 10 includes an electrical control circuit 16 and first and second light emitting sources 18 and 20 respectively.

The circuit 16 may take on any suitable form but preferably is in the nature of an integrated circuit.

The light emitting sources 18 and 20 may respectively comprise incandescent filaments, quartz halogen light sources, or the like. Again it is pointed out that devices of this kind are well known in the art and consequently they are not described in detail herein. It is assumed, for ease of reference only, that the sources 18 and 20 respectively comprise filaments for incandescent bulbs.

The circuit 16 and the light sources 18 and 20 are packaged in an enclosure 22 which is shown in dotted outline and which, as described hereinafter, is substantially of conventional shape and size. The enclosure 22 for example may include a hermetically sealed glass envelope with the elements 18 and 20 precisely positioned inside the envelope. The circuit 16 may be embedded in a base cap which is connected to the glass envelope. The intention in this regard is that the light emitting device 10, within limits, has the same external shape and size as a conventional globe or other light source which it is intended to replace, for example a retrofittable light bulb for a vehicle headlight, tail light or stop light.

The device 10 has electrical terminals 24 on an outer surface of the enclosure 22 or a component which is fixed to the enclosure, to enable the device to be electrically connected to the battery 14. Again this aspect is known in the art. For example the terminals 24 may be inserted into a socket to which the battery 14 is connected and the terminals may be held in electrical contact with corresponding terminals 26, which are electrically connected to the battery 14, by means of a screw, bayonet clip or other connection between the device and a suitable holder.

The nature of the electrical module 12 depends on the standard equipment in the vehicle with which the device 10 is used. Thus the module 12 normally includes at least an electrical switch to control the connection of the battery 14 to the light emitting device. The module 12 may however additionally include a monitoring circuit for detecting failure of a light source connected to the terminals 26.

The circuit 16 may vary according to requirement but, in this example, as is shown in FIG. 2, includes a detector 28, a delay unit 30 and a switching module 32. Although the components 28 to 32 are shown as discrete components it is to be understood that they may be in the form of separate hardware items or, where possible, may be implemented in the form of software which controls appropriate hardware.

Under normal operation of the device 10 the supply of electrical energy from the battery 14 to the element 18 is controlled by the electrical module 12. This module, for example, may correspond to a switch in the vehicle which is used to turn the headlights on or off. If the module 12 includes a failure detector then failure of the element 18 will be detected by the detector, in a conventional manner, and an indication of such failure will be provided to the driver of the vehicle in the appropriate way through the normal vehicle instrumentation.

Failure of the element 18 is however also detected by the detector 28. The detector may for example constantly monitor the current drawn by the element 18 and if the magnitude of the current varies appreciably from a predetermined level, for example due to an open circuit caused by the failure of the first light source, then this would be interpreted as failure of the element 18. The detector may then initiate a short delay period which may have a duration of the order of 0,5 seconds. The delay period is measured by the delay unit 30. At the end of the delay period the switching module 32 is energized. The switching module connects the power to the second element 20 which then operates in place of the element 18, thereby restoring the light emitting function of the device 10.

In a variation of the invention the switching module 32 initially causes the element 20 to be turned on and off, i.e.

to flicker, for a short time interval the duration of which may be of the order of five seconds. This provides an indication to the driver of the vehicle that the element 18 has failed and that the element 20 is operating in its place. A combination of both the aforementioned methods may also be used. For example after a short period during which neither element emits light, the element 20 is caused to flicker for a brief period before being constantly energized. A signal may also be generated to report the failure of the element 18 to the vehicle driver or to an instrument display panel, e.g. via a digital command over a network or bus.

After the element 18 has failed the flicking of the element 20 may take place each time power is applied to the light emitting device 10 and not only when the element 18 fails. The driver of the vehicle is therefore repeatedly alerted to the fact that an element has failed and that the device 10 should be replaced in its entirety as soon as possible.

It is to be noted that at all times, including during the delay period which is controlled by the delay unit 30, the electrical module 12, which as pointed out may be standard equipment on the vehicle, detects the failure of the element 18 and provides a conventional indication of such failure to the driver. Thus the electronic system of the vehicle and its manner of operation are not affected by the use of the light emitting device of the invention which therefore provides an additional indication that an element has failed and then automatically causes the second element to be switched into line so that it is energized in place of the failed first element, thereby restoring such critical functions as headlights or brake lights to a vehicle.

In some cases, e.g. in the case of failed brake light, it may not be desirable to generate a delay before energizing a back-up light source, and another method of indicating the failure of the first light source to the electronics in the vehicle may be required. It may for example be acceptable to flicker a brake light source only after an initial activation period during which the vehicle's brakes are applied.

The foregoing techniques have been described in connection with a light on a vehicle e.g. a headlight, tail light or the like. If the light emitting device is used in a difficult to reach location, for example in an elevated mast, then the switching module 32, in addition to energizing the second light element 20, may be used to energize a separate indicating light source such as a light emitting diode 34 thereby to provide a visual indication that the first element 18 has failed and that the second element 20 is being used. Appropriate remedial action can therefore be taken at a suitable time. It is desirable, when routine service is performed, to be able to detect that the device 10 is functioning in its fall-back mode (using the second light source). This is readily achieved if a separate indicator is used to signal a failure. The device 10 can then be replaced before the spare (second) light source fails.

In another variation of the invention the second light source 20, the detector 28 and the switch 30, or the second light source 20 and the circuit 16, are packaged as a conventional light source which is then mounted to the light source 18, to be used by a back-up when required.

FIG. 3 illustrates a further embodiment of the invention which is in the form of a light bulb 40 with dim and beam elements 42 and 44 respectively and a third element 46 which can be used as a back-up for either of the elements 42 and 44. The bulb further includes a circuit 16A which is similar to that shown in FIG. 2. The bulb is shown surrounded by a solid line and this indicates that the bulb is provided as an integral unit which can be used as a replacement of, or a retrofit for, a conventional light bulb. It is to be borne in mind though that the electronic portions of the bulb, such as the circuit 16A, can be mounted externally to the bulb in which case the bulb in the example would require four "external" contacts, namely ground and power to each of the three light sources, or power and three contacts to be switched to ground.

FIG. 3 also illustrates a switch 48 controlling the application of power to the elements 42 and 44, i.e. for turning the headlights on or off, a switch 50 for selecting the dim element 42 or the beam element 44, and a back-up activation switch 52. The switches 48 and 50 are conventional and are provided as original equipment in the vehicle. The switch 52 is electronically controlled and corresponds generally to the switch 32 shown in FIG. 2. The switch 52 is shown "outside" the circuit 16A but it is to be understood that this switch can form an integral part of the circuit 16A, particularly if this circuit is an integrated circuit.

A sensor 54 monitors current flow through the elements 42 and 44 and detects failure of either of these elements.

Leads 56 and 58 which are connected to conductors going from the switch 50 to the dim and beam elements respectively are used to determine which element is active i.e. selected by the switch 50.

The control circuit 16A is powered directly from the power supplied to the light elements, via a regulator 60.

The sensor 54 constantly monitors the operation of the elements 42 and 44. If one of these elements fails then the switch 52 is activated and the back-up element 46 is automatically used in place of the failed element.

Once back-up action has taken place a flashing sequence may not always be acceptable each time an element is energized. The flashing routine could then, for example, only be performed upon first activation of power, for example when the lights are switched on via the switch 48, but not when switching occurs between the dim and beam elements by means of the switch 50.

Figure 4:
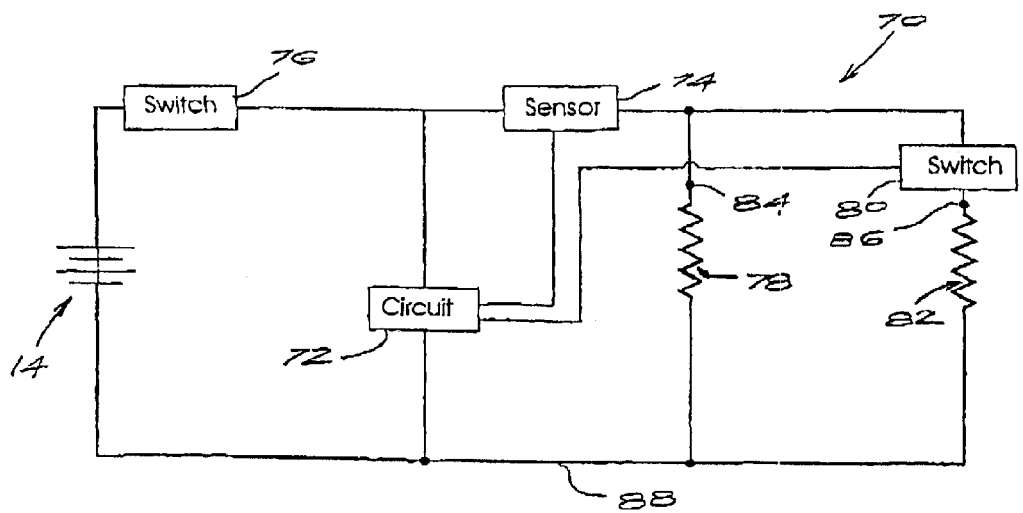

FIG. 4 shows another embodiment 70 of the invention wherein an electronic control circuit 72 is designed to monitor the flow of current through a current detecting sensor 74, such as a Hall-effect device or a low resistance, which will cause a voltage drop. A conventional switch 76, similar to a light switch in a vehicle, is used to connect an energy source 14 to a light source 78. The electronic circuit 72, in response to the sensor 74, monitors the current flow to the light source and, when the light source fails, detects the resulting reduction in the amplitude of the current which flows to the light source. The circuit then activates a switch 80 to connect the energy source 14 to a duplicate or spare light source 82. The activation of the light source 82 can happen in accordance with design parameters such as after a short delay, after a period or sequence of flickering, or as quickly as possible. The light source 82 may emit light of the same intensity as the light source 78, or light of reduced intensity.

In a variation of the invention, the sensor 74 in FIG. 4 is of a kind which does not need to be a series component of the energy transfer circuit between the energy source 14 and the light sources 78 and 82, and for example may be a light sensor or a heat sensor. In this case no additional elements are placed in-line with the first filament 78 and therefore failure of the circuit 72 or of the sensor 74 does affect the primary operation of the bulb 70.

The full circuit may be positioned in a housing which is similar or identical to a housing of a conventional bulb and can thus operate as a direct replacement for a conventional bulb. Alternatively the circuit may be mounted externally to the bulb in which case an additional contact will be required for the bulb and points 84, 86, and 88, shown in FIG. 4, will be contacts to the light elements.

Figure 5:
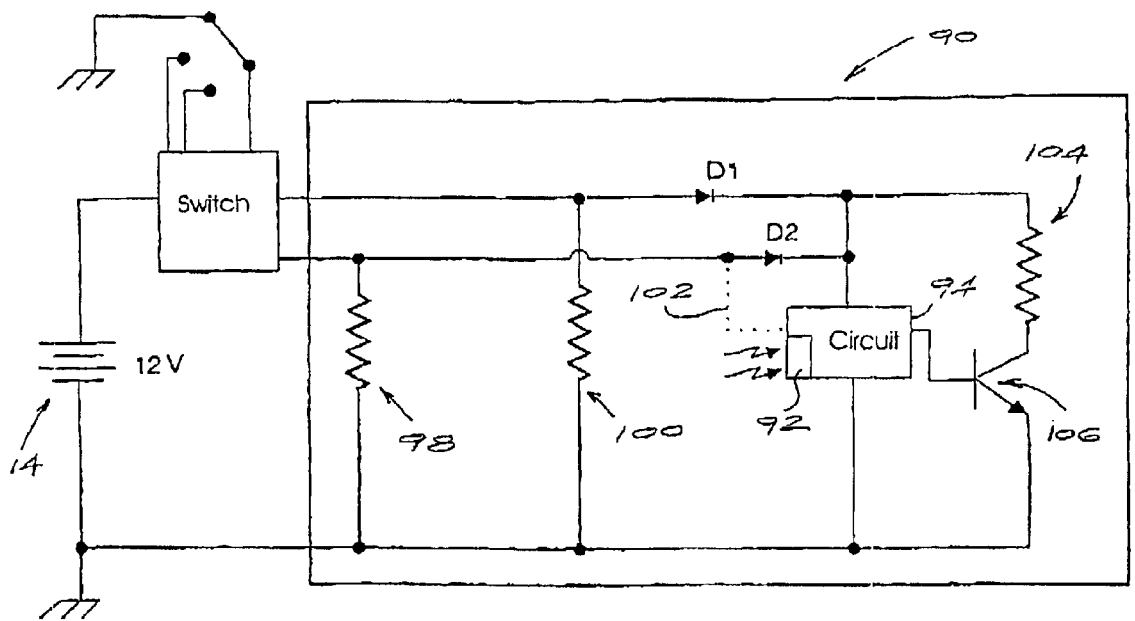

FIG. 5 shown an example of a circuit 90 accordance with the invention which includes a sensor 92 which is responsive to visible or infrared frequencies, on a silicon chip or integrated circuit 94 which is packaged in a translucent form e.g. in a translucent or light-transmitting housing 90A. The sensor 92 may be any appropriate light sensitive device such as a light sensitive diode, which can be formed as part of the integrated circuit 94 using a standard production process such as a CMOS technique.

A switch 96, which may be of a standard kind used in vehicle, is provided to select dim or bright headlights, corresponding to light sources 98 and 100, respectively. If either light source 98 or 100 is energized the circuit 94 is automatically powered via a diode D1 or D2. At least one additional input 102 can be used to enable the circuit 94 to detect if it was switched on via the element 98 or the element 100.

The circuit 94 is positioned so that light from either of the elements 98 and 100 would fall on the sensor 92. A threshold can be set and a reading of less light than the threshold will cause the circuit 94 to decide that the selected filament 98 or 100 has failed. In this event a spare or back-up filament 104 can be switched on via a switching circuit 106 such as a transistor, field effect transistor or the like. If the circuit 94 can detect which light 98 or 100 was selected it may be beneficial to have two threshold settings to enable better decision making about the failure of a filament. This may become more relevant for combined brake light and tail light bulbs in day time operation when the bulbs are exposed to the effects of sunlight.

A single spare light element can be used to provide back-up for two light sources of different intensities e.g. a brake light and a tail light. Referring again to FIG. 5 the circuit 94 has the capability of detecting whether the light 98 or 100 has failed and the circuit can then readily be used to control the duty cycle of the switch 106 so that the intensity of the back-up filament 104 can be varied, as required, to match the intensity of the failed light source 98 or 100, as the case may be.

In the drawings the switching of the light elements is shown as taking place on the positive side of the battery's supply. This is only a convention and should not be seen as limited for switching could also take place on the negative side of the supply.

What is claimed is:

1. A light emitting device which includes at least a first light source which is connectable to an energy source, a second light source, detector means for detecting a failure of the first light source, and switch means, responsive to the detector means, for enabling the connection of the second light source to the energy source when the detector means detects failure of the first light source, and which is characterized in that the device includes at least one of the following:
   (a) delay means and wherein the switch means is responsive to the delay means so that the connection of the second light source to the energy source is enabled a predetermined time interval after detecting failure of the first light source; and
   (b) indicator means for causing a recognizable variation in operation of the second light source.

2. A device according to claim 1 which includes an indicator for providing an indication of the failure of the first light source.

3. A device according to claim 1 which includes an integrated circuit and wherein at least one of the detector means and the switch means is incorporated in the integrated circuit.

4. A device according to claim 3 wherein the detector means is a light sensitive device suitable for being manufactured as part of the integrated circuit.

5. A device according to claim 1 which is packaged or configured in the shape of a conventional light source so that the light emitting device can be used as a direct replacement of the conventional light source.

6. A device according to claim 1 which includes an enclosure which is at least partly translucent and wherein the first and second light sources are located inside the enclosure, and the detector means and switch means are mounted to or located within the enclosure.

7. A device according to claim 1 which includes a third light source and wherein the detector means, upon detecting a failure of the first light source or the third light source, enables the connection of the second light source to the energy source as a replacement of the failed light source.

8. A device according to claim 7 wherein the duty cycle of the switch means is variable to control the intensity of the second light source depending on whether the first or third light source failed.

9. A device according to claim 1 wherein the duty cycle of the switch means is variable to control the intensity of the second light source.

10. A device according to claim 1 which includes a control circuit for controlling operation of the switch means.

* * * * *